US011068206B2

(12) United States Patent
Cho et al.

(10) Patent No.: US 11,068,206 B2
(45) Date of Patent: Jul. 20, 2021

(54) DATA STORAGE DEVICE FOR PROCESSING A SEQUENTIAL UNMAP ENTRY BY USING TRIM INSTRUCTION DATA AND OPERATING METHOD THEREOF

(71) Applicant: SK hynix Inc., Gyeonggi-do (KR)

(72) Inventors: Young Ick Cho, Seoul (KR); Sung Kwan Hong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 91 days.

(21) Appl. No.: 16/578,582

(22) Filed: Sep. 23, 2019

(65) Prior Publication Data

US 2020/0218470 A1 Jul. 9, 2020

(30) Foreign Application Priority Data

Jan. 7, 2019 (KR) .................. 10-2019-0001718

(51) Int. Cl.
  *G06F 3/06* (2006.01)
  *G06F 12/10* (2016.01)
(52) U.S. Cl.
  CPC .......... *G06F 3/0659* (2013.01); *G06F 3/0608* (2013.01); *G06F 3/0679* (2013.01); *G06F 12/10* (2013.01); *G06F 2212/1044* (2013.01)
(58) Field of Classification Search
  None
  See application file for complete search history.

(56) References Cited

U.S. PATENT DOCUMENTS

| 2012/0198174 | A1* | 8/2012 | Nellans | G06F 3/0655 711/133 |
| 2013/0151754 | A1* | 6/2013 | Post | G06F 12/0246 711/103 |
| 2013/0166855 | A1* | 6/2013 | Batwara | G06F 9/5016 711/154 |
| 2019/0034287 | A1* | 1/2019 | Hsieh | G06F 3/065 |
| 2019/0087348 | A1* | 3/2019 | Liao | G06F 12/1009 |
| 2019/0121743 | A1* | 4/2019 | Park | G06F 12/0246 |
| 2019/0163621 | A1* | 5/2019 | Doh | G06F 3/064 |
| 2019/0258568 | A1* | 8/2019 | Park | G06F 3/0608 |
| 2020/0089648 | A1* | 3/2020 | Klein | G06F 12/0246 |

FOREIGN PATENT DOCUMENTS

| KR | 101465460 | 11/2014 |
| KR | 101735065 | 5/2017 |
| KR | 10-2020-0022118 A | 3/2020 |

* cited by examiner

*Primary Examiner* — Edward J Dudek, Jr.
*Assistant Examiner* — Ralph A Verderamo, III
(74) *Attorney, Agent, or Firm* — IP & T Group LLP

(57) ABSTRACT

A data storage device includes a nonvolatile memory device and a memory having an unmap command queue configured to store an unmap command received from a host, and a sequential unmap table configured to store a sequential unmap entry corresponding to an unmap command for sequential logical addresses, and a controller including a first core and a second core. The second core configured to read an unmap-target map segment including the sequential logical addresses from an address mapping table stored in the nonvolatile memory device, store the read unmap-target map segment in the memory, and change, within the stored unmap-target map segment, physical addresses mapped to the sequential logical addresses to trim instruction data at the same time, the trim instruction data being included in the sequential map entry.

14 Claims, 11 Drawing Sheets

FIG.4

SUT (Sequential Unmap Table)

| Start LBA | Length | Trim Instruction Data |
|---|---|---|
| LBA0 | 100 | 0x00000001 |
| LBA1000 | 50 | 0x00000001 |
| LBA2000 | 80 | 0x00000001 |
| ... | ... | ... |

Unmap CMD1 → Sequential Unmap Entry
Unmap CMD2
Unmap CMD3

FIG.5

Address Mapping Table

| Map Segment | Logical Address | Physical Address | |
|---|---|---|---|
| 0 | LBA0 | PBA0 | ← L2P Entry |
| | LBA1 | PBA1 | |
| | ⋮ | ⋮ | |
| | LBA99 | PBA99 | |
| ⋮ | ⋮ | ⋮ | |
| 99 | LBA9900 | PBA9900 | |
| | LBA9901 | PBA9901 | |
| | ⋮ | ⋮ | |
| | LBA9999 | PBA9999 | |

US 11,068,206 B2

DATA STORAGE DEVICE FOR PROCESSING A SEQUENTIAL UNMAP ENTRY BY USING TRIM INSTRUCTION DATA AND OPERATING METHOD THEREOF

CROSS-REFERENCES TO RELATED APPLICATION

The present application claims priority under 35 U.S.C. § 119(a) to Korean application number 10-2019-0001718, filed on Jan. 7, 2019, which is incorporated herein by reference in its entirety.

BACKGROUND

1. Technical Field

Various embodiments generally relate to an electronic device, and more particularly, to a data storage device and an operating method thereof.

2. Related Art

Recently, the paradigm for the computing environment has changed to a ubiquitous computing environment in which computer systems can be used anytime and anywhere. Therefore, the use of portable electronic devices such as mobile phones, digital cameras and notebook computers has rapidly increased. Such potable electronic devices generally use a data storage device using a memory device. The data storage device is used to store data which are used in the portable electronic devices.

Since a data storage device using a memory device has no mechanical driver, the data storage device has excellent stability, excellent durability, high information access speed, and low power consumption. The data storage device having such advantages includes a universal serial bus (USB) memory device, a memory card having various interfaces, a universal flash storage (UFS) device, and a solid state drive (SSD).

SUMMARY

Various embodiments are directed to a data storage device capable of effectively shortening or reducing an unmap operation time and an operating method thereof.

In an embodiment, a data storage device may include: a nonvolatile memory device; a memory including an unmap command queue configured to store an unmap command received from a host, and a sequential unmap table configured to store a sequential unmap entry corresponding to an unmap command for sequential logical addresses; and a controller including a first core configured to receive the unmap command transferred from the host and store the received unmap command in the unmap command queue of the memory; and a second core configured to read an unmap-target map segment including the sequential logical addresses from an address mapping table stored in the nonvolatile memory device, store the read unmap-target map segment in the memory, and change, within the stored unmap-target map segment, physical addresses mapped to the sequential logical addresses to trim instruction data at the same time, the trim instruction data being included in the sequential map entry.

In an embodiment, there is provided an operating method for a data storage device which includes a nonvolatile memory device and a controller configured to control the nonvolatile memory device. The operating method may include: reading an unmap-target map segment including sequential logical addresses from an address mapping table stored in the nonvolatile memory device when a map update operation is triggered, and storing the read unmap-target map segment in a memory; and changing, within the stored unmap-target map segment, physical addresses mapped to the sequential logical addresses to trim instruction data at the same time, the trim instruction data being included in a sequential unmap entry corresponding to the sequential logical addresses.

In an embodiment, there is provided an operating method for a data storage device. The operating method may include: generating a single piece of trim data for a group of sequential logical addresses; and unmapping a mapping relationship of the group by collectively changing physical addresses, which are mapped to the group, to the single piece in a batch processing way.

BRIEF DESCRIPTION OF THE DRAWINGS

FIG. 4 is a diagram illustrating a sequential unmap table of FIG. 2.

FIG. 5 is a diagram illustrating an address mapping table.

DETAILED DESCRIPTION

Hereinafter, a data storage device and an operating method thereof according to the present disclosure will be described below with reference to the accompanying drawings through exemplary embodiments.

Figure 1:
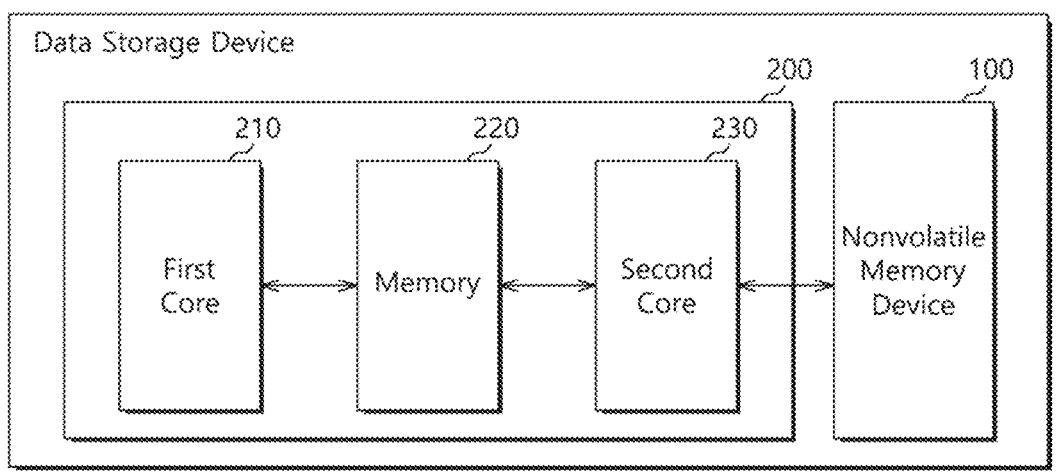
FIG. 1 illustrates a data storage device in accordance with an embodiment.

FIG. 1 illustrates a configuration of a data storage device 10 in accordance with an embodiment.

Referring to FIG. 1, the data storage device 10 in accordance with the present embodiment may store data accessed by a host (not illustrated) such as a mobile phone, MP3 player, laptop computer, desktop computer, game machine, TV, or in-vehicle infotainment system. The data storage device 10 may be referred to as a memory system.

The data storage device 10 may be fabricated as any one of various storage devices, according to an interface protocol coupled to the host. For example, the data storage device 10 may be configured as any one of various types of storage devices which include a solid state drive (SSD), a multimedia card (MMC) such as an eMMC, RS-MMC or micro-MMC, a secure digital (SD) card such as a mini-SD or micro-SD, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, a smart media card and a memory stick.

The data storage device 10 may be fabricated as any one of various types of packages. For example, the data storage device 10 may be fabricated as any one of various types of packages such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as a storage medium of the data storage device 10. The nonvolatile memory device 100 may be configured as any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using chalcogenide alloys, and a resistive random access memory (ReRAM) using transition metal oxide, depending on memory cells.

For simplification of the drawing, FIG. 1 illustrates the nonvolatile memory device 100 as one block, but the nonvolatile memory device 100 may include a plurality of memory chips. The present embodiment may also be applied in the same manner to the data storage device 10 including the nonvolatile memory device 100 constituted by a plurality of memory chips.

The nonvolatile memory device 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each memory cell of the memory cell array may be configured as a single level cell (SLC) for storing 1-bit data, a multi-level cell (MLC) for storing 2-bit data, a triple level cell (TLC) for storing 3-bit data, or a quadruple level cell (QLC) for storing 4-bit data. The memory cell array 110 may include one or more of the SLC, the MLC, the TLC and the QLC. For example, the memory cell array 110 may include memory cells with a two-dimensional horizontal structure and memory cells with a three-dimensional vertical structure.

The controller 200 may control overall operations of the data storage device 10. The controller 200 may process requests received from the host. The controller 200 may generate control signals for controlling an operation of the nonvolatile memory device 100 based on the requests received from the host, and provide the generated control signals to the nonvolatile memory device 100. The controller 200 may include a first core 210, a memory 220 and a second core 230.

The first core 210 may be configured to interface the host and the data storage device 10 in response to a protocol of the host. Therefore, the first core 210 may be referred to as a protocol core. For example, the first core 210 may communicate with the host through any one protocol of USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and PCIe (PCI express).

The first core 210 may include a micro control unit (MCU) and a central processing unit (CPU). The first core 210 may receive commands transferred from the host, and provide the received commands to the second core 230.

The first core 210 may store data (for example, write data) received from the host in a write buffer of the memory 220. For this operation, the controller 200 may further include a separate data transfer block (not illustrated) for transferring the data received from the host to the write buffer of the memory 220. For example, the data transfer block may receive data from the host according to a control signal received from the first core 210, and store the received data in the write buffer of the memory 220.

The first core 210 may transfer data (for example, read data) stored in a read buffer of the memory 220 to the host. For example, the data transfer block may read the data stored in the read buffer of the memory 220 according to the control signal received from the first core 210, and transfer the read data to the host.

The first core 210 may generate a descriptor based on a command received from the host, and provide the generated descriptor to the second core 230. The descriptor may indicate a statement of work, which includes information required for the second core 230 to process the command received from the host.

When an unmap command is received from the host, the first core 210 may queue the received unmap command in an unmap command queue (which will be described with reference to FIGS. 2 and 3) allocated in a command queue of the memory 220.

The memory 220 may be configured as a RAM such as a static RAM (SRAM), but it not limited thereto. The memory 220 may be physically and electrically coupled to the first and second cores 220 and 230. The memory 220 may store the firmware driven by the second core 230. Furthermore, the memory 220 may store data required for driving the firmware, for example, metadata. That is, the memory 220 may operate as a working memory of the second core 230.

The memory 220 may include a buffer for temporarily storing write data to be transferred to the nonvolatile memory device 100 from the host or read data to be transferred to the host from the nonvolatile memory device 100. That is, the memory 220 may operate as a buffer memory. The internal configuration of the memory 220 will be described in detail with reference to FIG. 2.

The second core 230 may control overall operations of the data storage device 10 by driving firmware or software loaded to the memory 220. The second core 230 may decode and drive a code-based instruction or algorithm such as firmware or software. Therefore, the second core 230 may also be referred to as a flash translation layer (FTL) core. The second core 230 may include a micro control unit (MCU) and a central processing unit (CPU).

The second core 230 may generate control signals for controlling an operation of the nonvolatile memory device 100 based on the command provided through the first core 210, and provide the generated control signals to the nonvolatile memory device 100. The control signals may include a command, address and operation control signal for controlling the nonvolatile memory device 100. The second core 230 may provide write data to the nonvolatile memory device 100, or receive read data from the nonvolatile memory device 100.

The second core 230 may further include an error correction code (ECC) circuit which generates parity data by performing ECC encoding on write data provided from the host, and performs ECC decoding on data read from the nonvolatile memory device 100 using the parity data.

Figure 2:
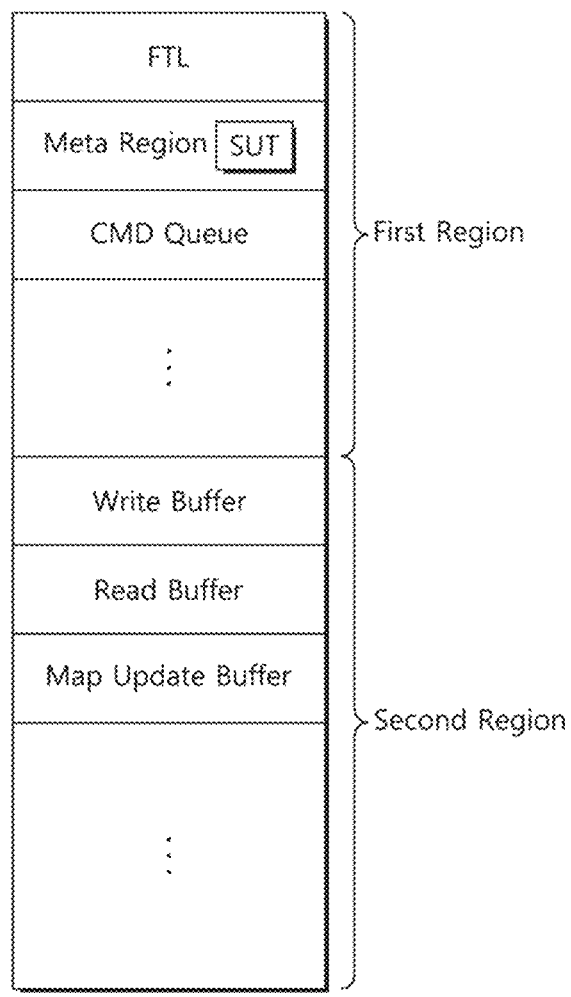
FIG. 2 is a diagram illustrating a memory of FIG. 1.

FIG. 2 is a diagram illustrating the memory 220 of FIG. 1.

Referring to FIG. 2, the memory 220 in accordance with the present embodiment may be divided into first and second regions, but the present embodiment is not limited thereto. For example, the first region of the memory 220 may store software analyzed and driven by the second core 230 and metadata required for the second core 230 to perform a computation and processing operation, and the second region of the memory 220 may include buffers for temporarily storing write data, read data, map data and the like. However, the present embodiment is not limited thereto. For example, a distance between the first region of the memory 220 and each of the first and second cores 210 and 230 may be smaller than a distance between the second region of the memory 220 and each of the first and second cores 210 and 230, but the present embodiment is not limited thereto. As the first region of the memory 220 is located physically close to the first and second cores 210 and 230, the first and second cores 210 and 230 may quickly access the first region of the memory 220.

For example, the first region of the memory 220 may store the FTL. The FTL may indicate software driven by the second core 230, and the second core 230 may drive the FTL to control a unique operation of the nonvolatile memory device 100, and provide device compatibility to the host. As the FTL is driven, the host may recognize and use the data storage device 10 as a general data storage device such as a hard disk.

The FTL may include modules for performing various functions. For example, the FTL may include a read module, a write module, a garbage collection module, a wear-leveling module, a bad block management module, a map module and the like. The FTL may be stored in a system region (not illustrated) of the nonvolatile memory device 100. When the data storage device 10 is powered on, the FTL may be read from the system region of the nonvolatile memory device 100 and loaded to the first region of the memory 220. The FTL loaded to the first region of the memory 220 may be loaded to a memory (not illustrated) which is dedicated to the second core 230 and separately provided inside or outside the second core 230.

The first region of the memory 220 may include a meta region for storing metadata required for driving various modules included in the FTL. The meta region may store a sequential unmap table (SUT) generated by the second core 230. The SUT will be described with reference to FIG. 4.

The first region of the memory 220 may include a command (CMD) queue in which commands received from the host are queued. The command queue may include a plurality of command queues which are divided according to the attributes of the commands. The first core 210 may queue the commands received from the host in the corresponding command queues according to the attributes of the commands.

The second region of the memory 220 may include a write buffer, a read buffer, a map update buffer and the like.

The write buffer may be configured to temporarily store write data to be transferred to the nonvolatile memory device 100 from the host. The read buffer may be configured to temporarily store read data which is read from the nonvolatile memory device 100 and will be transferred to the host. The map update buffer may be configured to temporarily store a map segment whose mapping information is to be updated.

Figure 3:
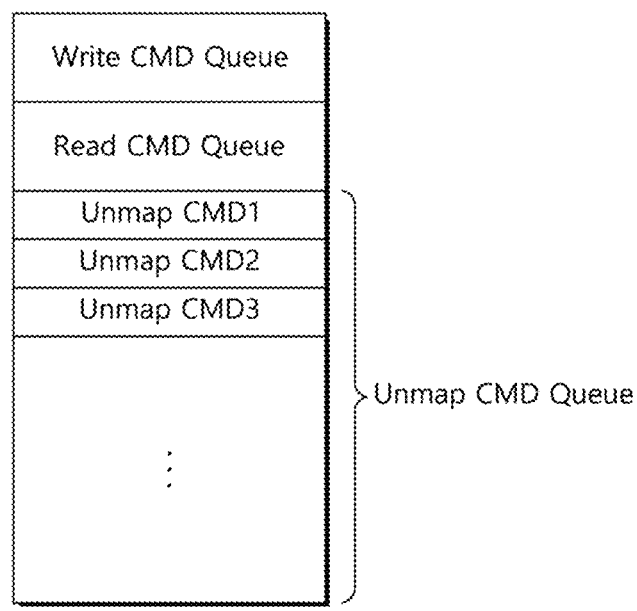
FIG. 3 is a diagram illustrating a command (CMD) queue of FIG. 2.

FIG. 3 is a diagram illustrating the command queue of FIG. 2.

As described above, the command queue may include a plurality of command queues. For example, as illustrated in FIG. 3, the command queue may include a write command queue in which write commands are queued, a read command queue in which read commands are queued, and an unmap command queue in which unmap commands are queued. For convenience of description, FIG. 3 illustrates three command queues in which three types of commands are queued, but the present embodiment is not limited thereto.

When unmap commands are received from the host, the first core 210 may sequentially queue the received unmap commands in the unmap command queue. At this time, although not specifically illustrated in FIG. 3, each of the queued unmap commands may correspond to logical addresses, which run without discontinuity from a start logical address. Each of the queued unmap commands may include a start logical address Start LBA and length information (or data size information) Length of the corresponding logical addresses. The length information Length may correspond to a total number of the corresponding logical addresses. The data size information may correspond to the sum of data sizes stored in storage regions indicated by the corresponding logical addresses.

The unmap commands received from the host may be classified into random unmap commands and sequential unmap commands according to the length information (or data size information) of the corresponding logical addresses. For example, the second core 230 may determine that an unmap command whose length information (or data size information) of the corresponding logical addresses is equal to or more than a preset threshold value, among the unmap commands queued in the unmap command queue, is a sequential unmap command.

The logical addresses corresponding to the sequential unmap command may be sequential logical addresses having a greater length or data size than the preset threshold value. In an embodiment, the logical addresses corresponding to the sequential unmap command may be those in one or more map segments, which will be described with reference to FIG. 6.

FIG. 4 is a diagram illustrating the sequential unmap table (SUT) in accordance with the present embodiment.

As described above, the second core 230 may determine whether each of the unmap commands queued in the unmap command queue is a sequential unmap command based on the length information (or data size information) included in the unmap command. As illustrated in FIG. 4, the second core 230 may generate sequential unmap entries corresponding to the sequential unmap commands, and generate the SUT composed of one or more sequential unmap entries. The second core 230 may store the SUT in the meta region of the first region of the memory 220, but the present embodiment is not limited thereto. The second core 230 may store the SUT in a random region of the memory 220.

Referring to FIG. 4, each of the sequential unmap entries may include fields of a start logical address Start LBA of the sequential logical addresses corresponding to the sequential unmap command, length information Length of the sequential logical addresses and trim instruction data. The trim instruction data may have any predetermined pattern having a format of a physical address. For example, the trim instruction data indicates address-type data in which a trim bit is set to a 'set' state, and the other bits except the trim bit are set to zero (0). The trim instruction data may replace physical addresses mapped to the sequential logical addresses corresponding to the sequential unmap command. Trimming may indicate removing a mapping relationship between a logical address and a physical address.

For example, when the trim instruction data includes 32 bits, one specific bit of the 32 bits may be used as the trim bit. For example, the trim bit having a first value may indicate removing (i.e., trimming) of the relationship between a logical address and a physical address. For example, the trim bit having a second value may indicate keeping of the relationship between a logical address and a physical address. The first value may be set to '1', and the second value may be set to '0'. However, the present embodiment is not limited thereto. In the present embodiment, the case in which '1' is used as the first value will be taken as an example for description.

Referring to FIGS. 3 and 4, when unmap commands Unmap CMD1 to Unmap CMD3 are all sequential unmap commands, the second core 230 may generate sequential unmap entries corresponding to the respective unmap commands Unmap CMD1 to Unmap CMD3, and generate the SUT composed of the sequential unmap entries. For example, trim instruction data included in each of the sequential unmap entries may have a value of '0x00000001'. This may indicate an example in which the zeroth bit of the trim instruction data including 32 bits is used as the trim bit, and the other bits except the trim bit, i.e. the first to 31st bits, are set to '0'.

FIG. 5 is a diagram illustrating an address mapping table.

Although not illustrated in FIG. 1, the nonvolatile memory device 100 may include the address mapping table illustrated in FIG. 5.

Referring to FIG. 5, the address mapping table may include a plurality of map segments. Each of the map segments may include a plurality of logical to physical (L2P) entries. Each of the L2P entries may include one physical address mapped to one logical address. The logical addresses included in each of the map segments may be sorted and fixed in ascending order, and physical addresses mapped to the respective logical addresses may be updated. For convenience of description, FIG. 5 illustrates an example in which the address mapping table includes 100 map segments 0 to 99, and each of the map segments 0 to 99 includes 100 L2P entries. However, the number of the map segments and the number of the L2P entries are not specifically limited thereto.

Figure 6:
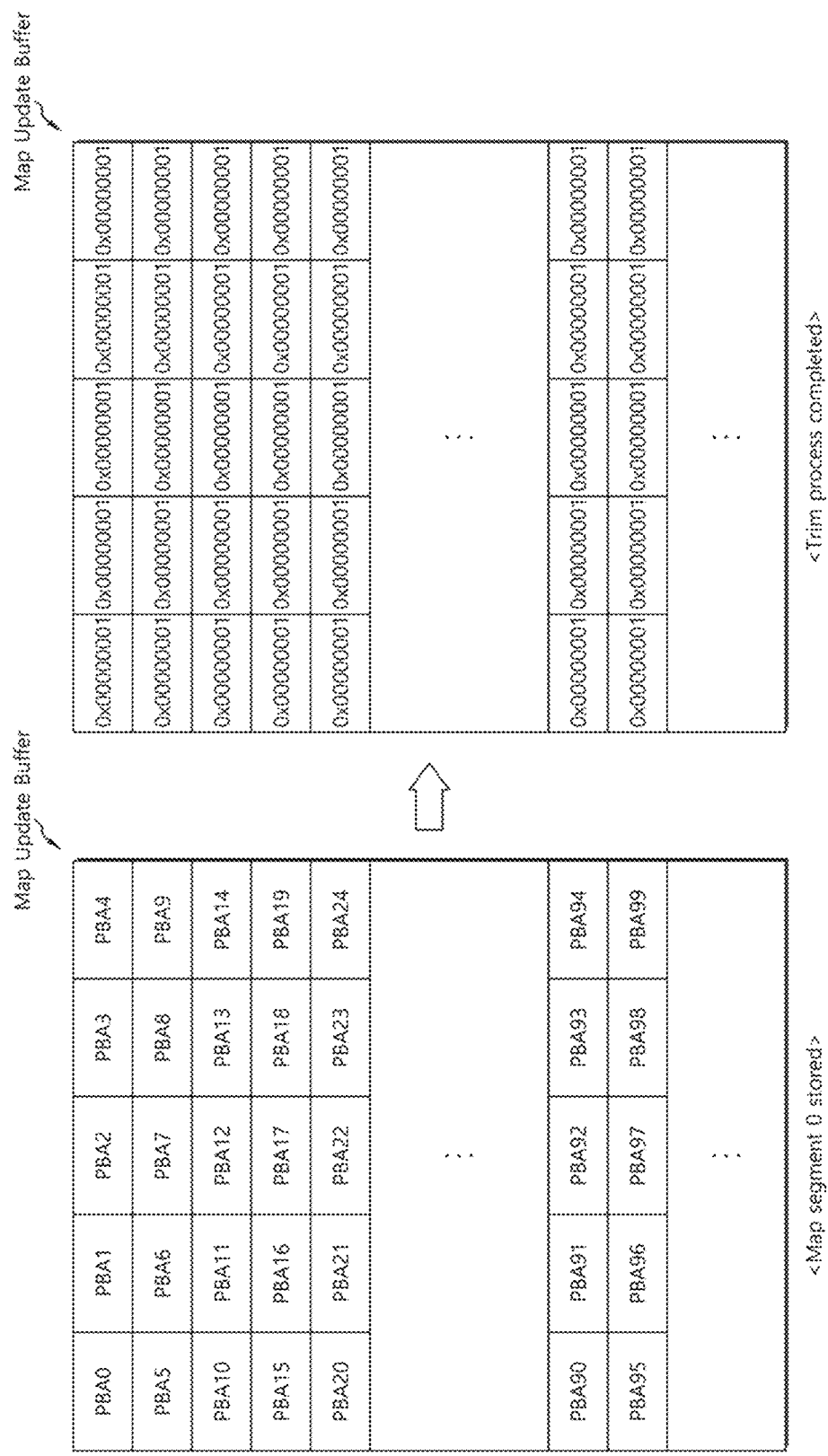
FIG. 6 is a diagram illustrating a process of trimming mapping information of sequential logical addresses.

FIG. 6 is a diagram illustrating a process of trimming mapping information of sequential logical addresses. Here, 'mapping information' may indicate information including logical addresses and physical addresses mapped to the logical addresses. For example, 'mapping information' may indicate L2P information.

When a map update operation is triggered, the second core 230 may read a map segment to be updated, among the map segments stored in the address mapping table of the nonvolatile memory device 100, and store the read map segment in the map update buffer of the memory 220. The map update operation may be triggered under various conditions including the case in which a P2L (Physical-to-Logical) table included in the meta region of the memory 220 is full or the case in which a request is provided from the host. However, the present embodiment is not limited thereto, and the map update operation may be triggered under various conditions, according to design and need.

In general, the map update operation may be performed through a series of processes of reading a map segment to be updated from the address mapping table, storing the read map segment in the map update buffer of the memory 220, changing physical addresses mapped to logical addresses by referring to the P2L table, and storing the map segment, whose physical addresses have been changed, in the address mapping table again.

During the map update operation, a map segment to be unmapped may be trimmed. Hereafter, the map segment to be unmapped will be referred to as an unmap-target map segment. For example, the second core 230 may read the unmap-target map segment (for example, 'map segment 0') among the map segments stored in the address mapping table of the nonvolatile memory device 100, and store the read map segment in the map update buffer of the memory 220.

Referring to FIG. 6, each region of the 'map segment 0' stored in the map update buffer may correspond to one logical address, and a value stored in each region may indicate a physical address currently mapped to the logical address of a corresponding region. Referring to FIGS. 4 and 5, the map segment 0 stored in the map update buffer in FIG. 6 may correspond to the first unmap command Unmap CMD1.

The second core 230 may refer to the SUT of FIG. 4, in order to trim the logical addresses 'LBA0 to LBA99' of the 'map segment 0' stored in the map update buffer. For example, the second core 230 may check a sequential unmap entry corresponding to the first unmap command Unmap CMD1 in the SUT, and replace all physical addresses in all regions (i.e., regions from the first region corresponding to 'LBA0' to the last region corresponding to 'LBA99') with the trim instruction data (i.e., '0x00000001') within the map segment 0.

Therefore, data of which the trim bit is T and the other bits are '0' may be stored in all the regions of the 'map segment 0' stored in the map update buffer. For example, the operation of replacing the physical addresses with the trim instruction data of '0x00000001' in all the regions of the 'map segment 0' may be performed through a memset function. The memset function may store the same values (i.e., the value '0x00000001' of the trim instruction data) in all regions within a preset space (e.g., the map segment 0) at the same time, according to variables such as the start region (e.g., the first region corresponding to 'LBA0'), a value (e.g., the value '0x00000001' of the trim instruction data) to be stored in the preset space (e.g., the map segment 0), and the size (e.g., 100 corresponding to LBA0 to LBA99) of the preset space (e.g., the map segment 0).

For example, the second core 230 may replace the physical addresses with the trim instruction data of '0x00000001' in the regions 'LBA0 to LBA99' of the 'map segment 0' at a same time, using the memset function.

When the replacement of the physical addresses with the trim instruction data of '0x00000001' is completed in all the regions of the 'map segment 0', the second core 230 may store the trimmed 'map segment 0', in which the physical addresses are replaced with the trim instruction data of '0x00000001', in the nonvolatile memory device 100. Therefore, the trimming process for the 'map segment 0' may be completed.

As described above, the data storage device may generate a sequential unmap entry corresponding to sequential logical addresses when an unmap request for the sequential logical addresses is provided, and may unmap mapping information of the sequential logical addresses through collective change of physical addresses mapped to the sequential logical addresses to a single piece of trim instruction data at a same time (i.e., in a batch processing way) by using the sequential unmap entry during the map update operation, thereby shortening the time required for the trimming process.

Figure 7:
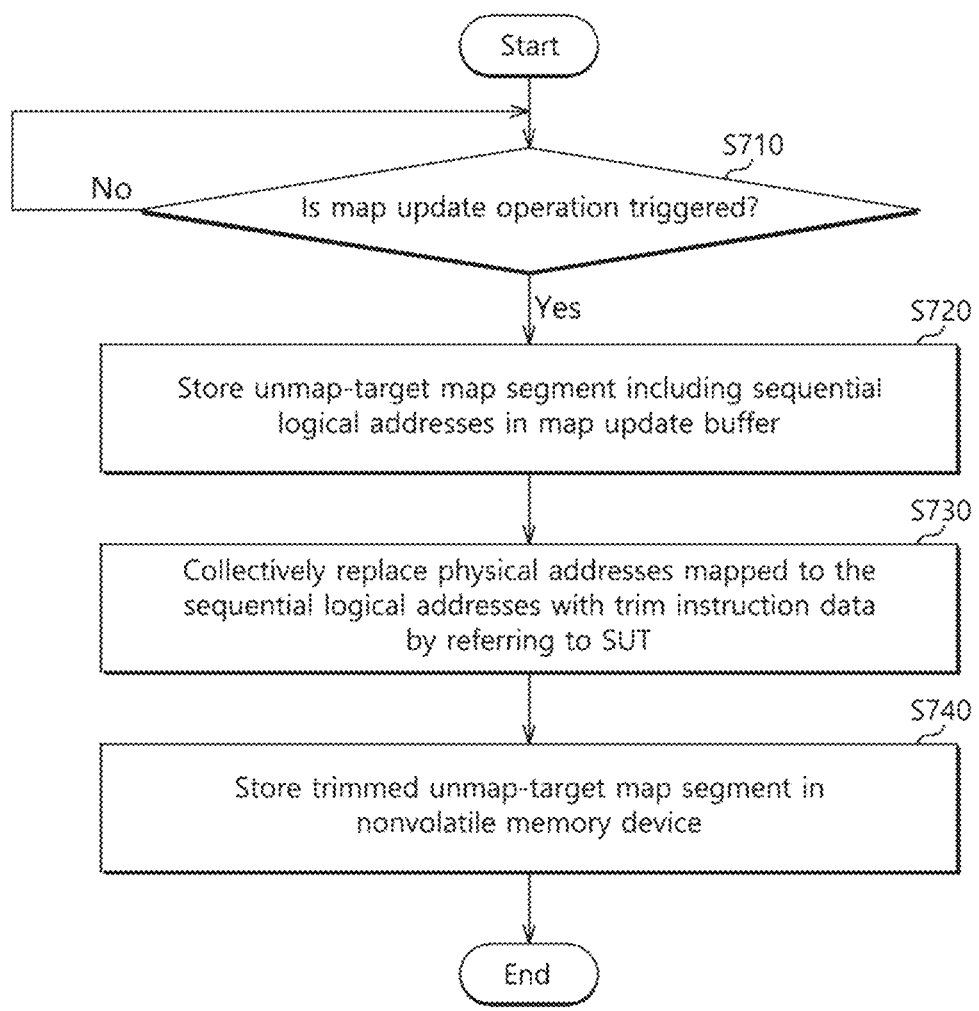
FIG. 7 is a flowchart illustrating an operating method of a data storage device in accordance with an embodiment.

FIG. 7 is a flowchart illustrating an operating method of the data storage device in accordance with an embodiment. While the operating method of the data storage device 10 in accordance with the present embodiment is described with reference to FIG. 7, one or more of FIGS. 1 to 6 may be referred to.

In step S710, the second core 230 of the controller 200 may determine whether the current condition has reached a condition to trigger a map update operation. Since the condition to trigger the map update operation has been described above, the detailed descriptions thereof will be omitted herein. When the current condition reaches the condition to trigger the map update operation, the process may proceed to step S720.

In step S720, the second core 230 may read an unmap-target map segment including logical addresses from the address mapping table of the nonvolatile memory device 100, and store the read map segment in the map update buffer of the memory 220.

As described above, each of the unmap commands may correspond to logical addresses, which run without discontinuity from a start logical address. Each of the unmap commands may include a start logical address Start LBA and length information (or data size information) Length of the corresponding logical addresses. The second core 230 may determine that an unmap command whose length information (or data size information) of the corresponding logical addresses is equal to or more than a preset threshold value, among the unmap commands queued in the unmap command queue, is a sequential unmap command. The logical addresses corresponding to the sequential unmap command may be sequential logical addresses having a greater length or data size than the preset threshold value.

In step S730, the second core 230 may replace, in response to the sequential unmap command, all physical addresses in all regions (e.g., regions from the first region corresponding to 'LBA0' to the last region corresponding to 'LBA99') with the trim instruction data (e.g., '0x00000001') within the unmap-target map segment stored in the map update buffer using the memset function. The trim instruction data may have a trim bit of '1' and the other bits of '0'. The trim instruction data of the respective logical addresses to be trimmed, included in the unmap-target map segment, may be equal to one another.

In step S740, the second core 230 may store the trimmed unmap-target map segment in the nonvolatile memory device 100. Therefore, the unmap operation for the unmap-target map segment may be completed.

In accordance with the present embodiments, the data storage device and the operating method thereof may generate a sequential unmap entry corresponding to an unmap request for sequential logical addresses, and trim mapping information of the sequential logical addresses using the sequential unmap entry at the same time, thereby shortening the unmap operation time.

Figure 8:
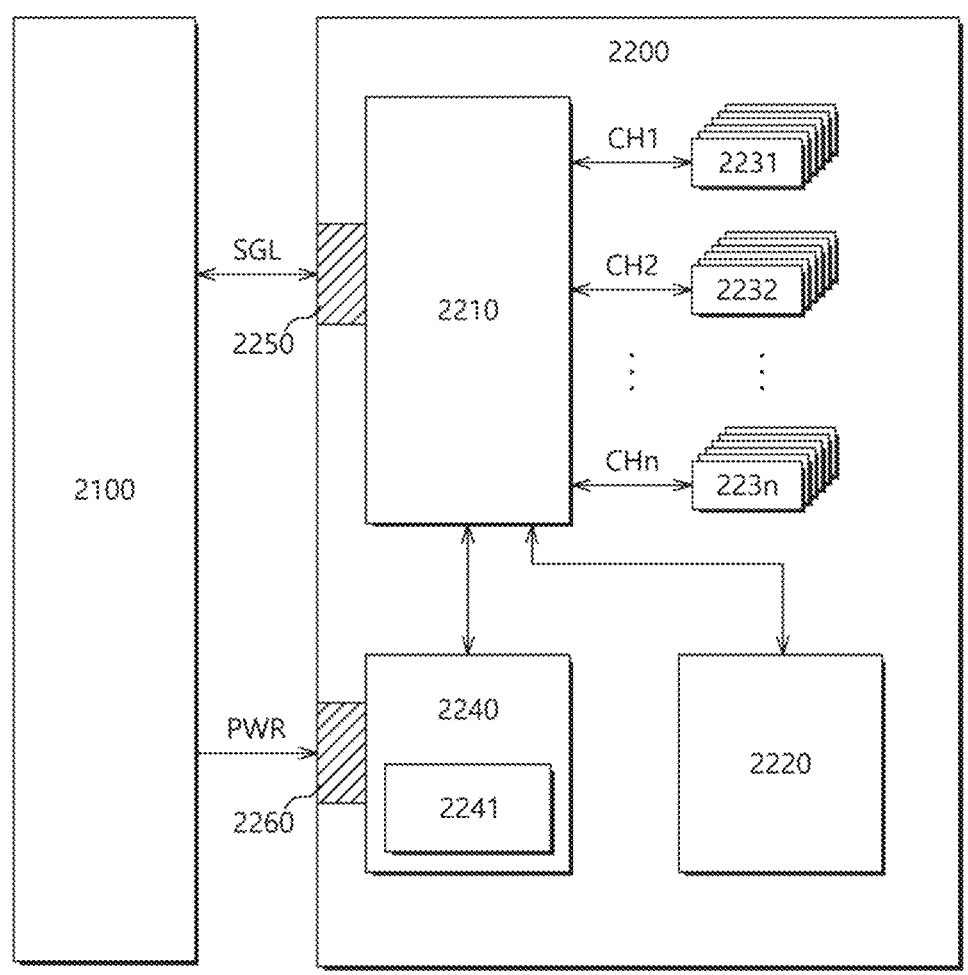
FIG. 8 illustrates a data processing system including a solid state drive (SSD) in accordance with an embodiment.

FIG. 8 illustrates a data processing system including a solid state drive (SSD) in accordance with an embodiment. Referring to FIG. 8, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 9:
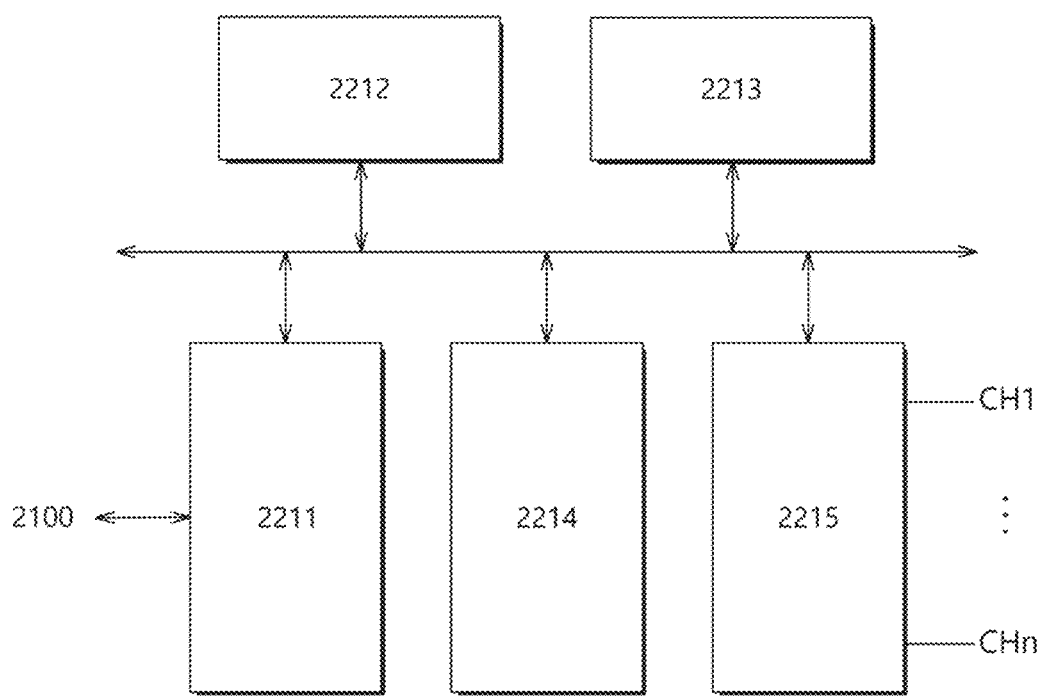
FIG. 9 illustrates a controller illustrated in FIG. 8.

FIG. 9 illustrates the controller 2210 of FIG. 9. Referring to FIG. 8, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATH) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223*n*. The generated parity data may be stored in the nonvolatile memory devices 2231 to 223*n* together with the data. The ECC unit 2214 may detect errors for data read from the nonvolatile memory devices 2231 to 223*n* based on the parity data. When detected errors are within a correctable range, the ECC unit 2214 may correct the detected errors.

The memory interface unit 2215 may provide a control signal such as a command and an address to the nonvolatile memory devices 2231 to 223*n* according to control of the control unit 2212. The memory interface unit 2215 may exchange data with the nonvolatile memory devices 2231 to 223*n* according to control of the control unit 2212. For example, the memory interface unit 2215 may provide data stored in the buffer memory device 2220 to the nonvolatile memory devices 2231 to 223*n* or provide data read from the nonvolatile memory devices 2231 to 223*n* to the buffer memory device 2220.

Figure 10:
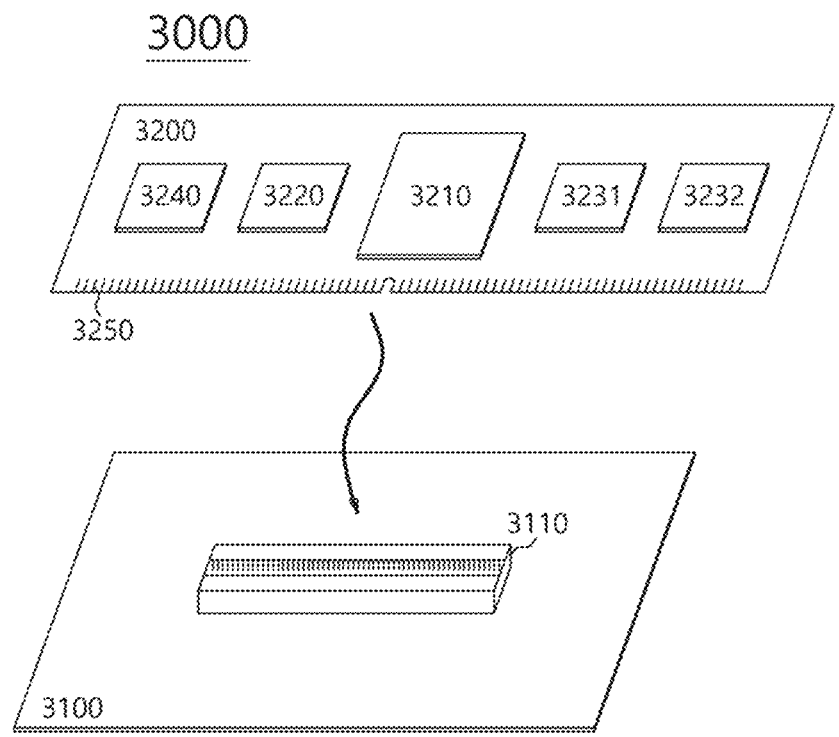
FIG. 10 illustrates a data processing system including a data storage apparatus in accordance with an embodiment.

FIG. 10 illustrates a data processing system including a data storage apparatus in accordance with an embodiment. Referring to FIG. 10, a data processing system 3000 may include a host apparatus 3100 and a data storage apparatus 3200.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 11:
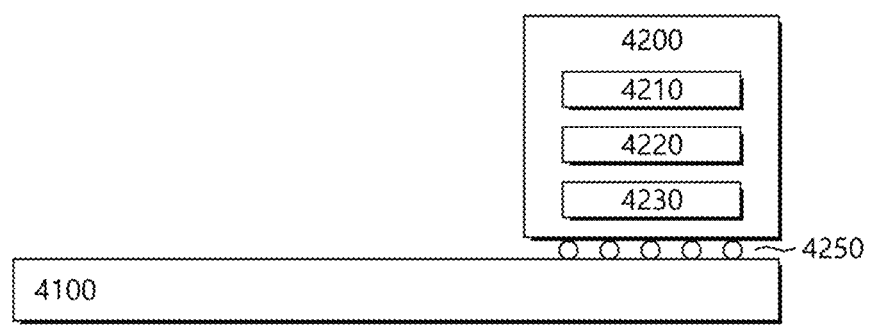
FIG. 11 illustrates a data processing system including a data storage apparatus in accordance with an embodiment.

FIG. 11 illustrates a data processing system including a data storage apparatus in accordance with an embodiment. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 12:
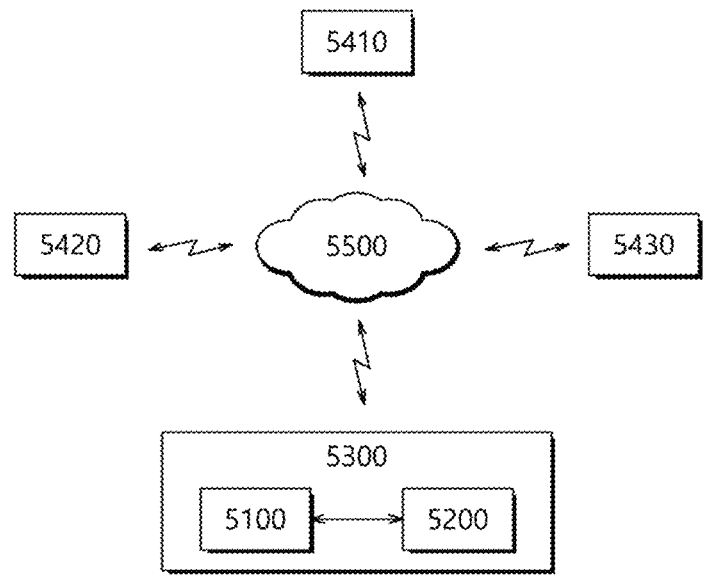
FIG. 12 illustrates a network system including a data storage apparatus in accordance with an embodiment.

FIG. 12 illustrates a network system 5000 including a data storage apparatus in accordance with an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the SSD 2200 of FIG. 8, the data storage apparatus 3200 of FIG. 10, or the data storage apparatus 4200 of FIG. 11.

Figure 13:
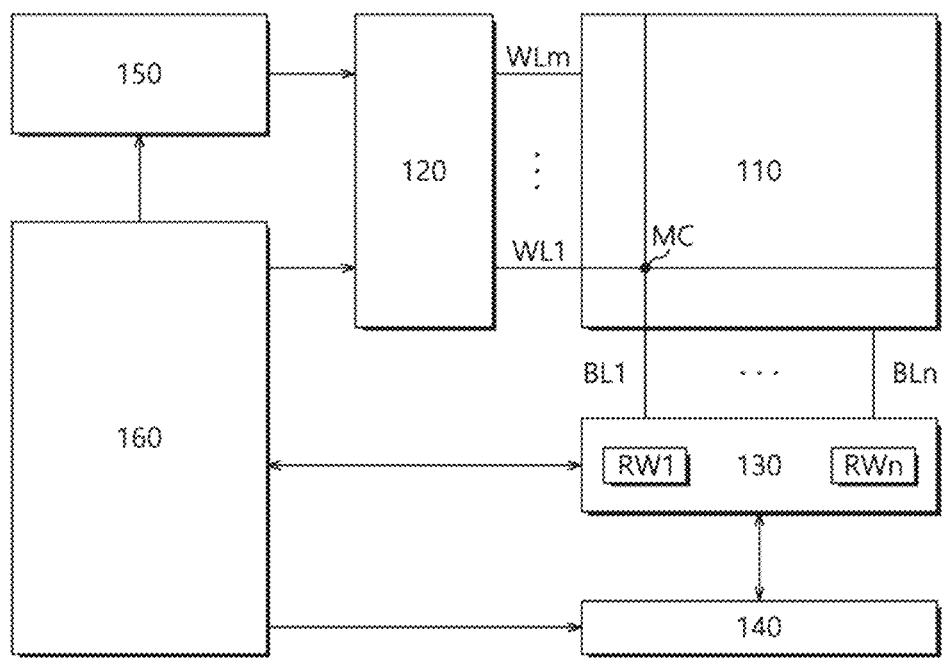
FIG. 13 illustrates a nonvolatile memory device included in a data storage apparatus in accordance with an embodiment.

FIG. 13 illustrates a nonvolatile memory device included in a data storage apparatus in accordance with an embodiment. Referring to FIG. 13, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the embodiments described are examples only. Accordingly, the data storage device and the operating method thereof, which have been described herein, should not be limited based on the described embodiments.

Although various embodiments have been described for illustrative purposes, it will be apparent to those skilled in the art that various changes and modifications may be made without departing from the spirit and scope of the invention as defined in the following claims.

What is claimed is:

1. A data storage device comprising:
 a nonvolatile memory device; and
 a memory including an unmap command queue configured to store an unmap command received from a host, and a sequential unmap table configured to store a sequential unmap entry corresponding to an unmap command for sequential logical addresses; and
 a controller comprising:
  a first core configured to receive the unmap command transferred from the host and store the received unmap command in the unmap command queue of the memory; and
  a second core configured to:
   read an unmap-target map segment including the sequential logical addresses from an address mapping table stored in the nonvolatile memory device;
   store the read unmap-target map segment in the memory; and
   change, within the stored unmap-target map segment, physical addresses mapped to the sequential logical addresses to trim instruction data at the same time, the trim instruction data being included in the sequential map entry.

2. The data storage device according to claim 1, wherein the sequential unmap entry comprises a start logical address of the sequential logical addresses, length information of the sequential logical addresses and the trim instruction data.

3. The data storage device according to claim 2, wherein the trim instruction data comprises a plurality of bits including a trim bit, and is mapping data in which the trim bit is set to a set state, and the other bits are set to 0.

4. The data storage device according to claim 2, wherein the length information corresponds to the total number of the sequential logical addresses including the start logical address.

5. The data storage device according to claim 1, wherein the trim instruction data is a single piece of data.

6. The data storage device according to claim 1, wherein the unmap command comprises a start logical address of the sequential logical addresses and length information of the sequential logical addresses, and
 the second core determines that an unmap command whose length information is equal to or more than a preset threshold value, among unmap commands queued in the unmap command queue of the memory, is a sequential unmap command, and generates the sequential unmap entry corresponding to the sequential unmap command and stores the sequential unmap entry in the sequential unmap table.

7. The data storage device according to claim 1, wherein the unmap command comprises a start logical address of the sequential logical addresses and data size information of the sequential logical addresses, and
 the second core determines that an unmap command whose data size information is equal to or greater than a preset threshold value, among unmap commands queued in the unmap command queue of the memory, is a sequential unmap command, and generates the sequential unmap entry corresponding to the sequential unmap command and stores the sequential unmap entry in the sequential unmap table.

8. The data storage device according to claim 7, wherein the data size information corresponds to the sum of data sizes corresponding to the sequential logical addresses.

9. The data storage device according to claim 1, wherein the second core changes all physical addresses mapped to the sequential logical addresses within the unmap-target map segment into the trim instruction data at the same time, using a memset function.

10. An operating method of a data storage device which includes a nonvolatile memory device and a controller configured to control the nonvolatile memory device, the operating method comprising:
 reading an unmap-target map segment including sequential logical addresses from an address mapping table stored in the nonvolatile memory device when a map update operation is triggered;
 storing the read unmap-target map segment in a memory; and
 changing, within the stored unmap-target map segment, physical addresses mapped to the sequential logical addresses to trim instruction data at the same time, the trim instruction data being included in a sequential unmap entry corresponding to the sequential logical addresses.

11. The operating method according to claim 10, further comprising the storing the changed unmap-target map segment in the nonvolatile memory device, after the changing the physical addresses to the trim instruction data.

12. The operating method according to claim 10, wherein the sequential unmap entry comprises a start logical address of the sequential logical addresses, length information of the sequential logical addresses and the trim instruction data.

13. The operating method according to claim 10, wherein the changing the physical addresses to the trim instruction data is performed through a memset function.

14. An operating method of a storage device, the operating method comprising:
- generating a single piece of trim data for a group of sequential logical addresses; and
- unmapping a mapping relationship of the group by collectively changing physical addresses, which are mapped to the group, to the single piece of the trim data in a batch processing way.

* * * * *